(12) United States Patent
Wassynger et al.

(10) Patent No.: US 7,661,924 B2
(45) Date of Patent: Feb. 16, 2010

(54) METHOD AND APPARATUS FOR ASSEMBLING TURBINE ENGINES

(75) Inventors: Stephen Paul Wassynger, Simpsonville, SC (US); Nicholas Francis Martin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 11/692,771

(22) Filed: Mar. 28, 2007

(65) Prior Publication Data

US 2008/0240912 A1     Oct. 2, 2008

(51) Int. Cl.
    *F01D 9/00* (2006.01)
(52) U.S. Cl. .................................... 415/137; 415/209.3
(58) Field of Classification Search ................. 415/137, 415/138, 209.2, 209.3, 209.4, 210.1
    See application file for complete search history.

(56) References Cited

U.S. PATENT DOCUMENTS

| 3,976,394 | A | | 8/1976 | Tarter et al. | |
|---|---|---|---|---|---|
| 4,142,827 | A | * | 3/1979 | Vinciguerra | 415/189 |
| 5,141,395 | A | * | 8/1992 | Carroll et al. | 415/196 |
| 6,183,195 | B1 | | 2/2001 | Tremaine | |
| 6,908,278 | B2 | | 6/2005 | Brunet et al. | |
| 7,090,462 | B2 | | 8/2006 | Martin et al. | |
| 2004/0191058 | A1 | | 9/2004 | Baumann et al. | |
| 2006/0045747 | A1 | * | 3/2006 | Martin et al. | 416/219 R |

* cited by examiner

*Primary Examiner*—Igor Kershteyn
(74) *Attorney, Agent, or Firm*—Armstrong Teasdale LLP

(57) ABSTRACT

A method of assembling a stator assembly includes coupling at least one stator ring segment to a portion of a casing using at least one circumferential stator ring groove defined in the casing. The method also includes coupling at least one stator blade assembly to a portion of the stator ring segment such that at least one radial passage is at least partially defined by at least one of the stator blade assembly and the stator ring segment. The stator assembly includes at least one first radial passage defined within a portion of the stator ring segment. The assembly also includes at least one second radial passage coupled in flow communication with the first radial passage. The second radial passage is at least partially adjacent to at least one of a portion of the stator blade assembly and a portion of the stator ring segment.

16 Claims, 6 Drawing Sheets

METHOD AND APPARATUS FOR ASSEMBLING TURBINE ENGINES

BACKGROUND OF THE INVENTION

The present invention relates generally to gas turbine engines, and more particularly, to methods and apparatus for channeling airflow through a gas turbine engine.

At least some components of known gas turbines may be subjected to high temperature environments, and cooling of such components may extend their useful life. At least one known cooling method includes channeling at least a portion of air from a compressor to components desired to be cooled. Generally, the methods and apparatus for channeling such air is referred to as compressor bleed. Some known compressor bleeds also facilitate reducing compressor stalling and/or compressor surges during compressor operation.

Known compressor bleeds channel a pre-determined percentage of the compressor's rated air flow from pre-determined locations defined within the compressor casing. However, some known compressor bleeds are defined in areas that may distort and/or weaken the compressor casing. Furthermore, the existing configuration of many known compressor bleeds are not easily modifiable to accommodate changes to the configuration and/or operation of the gas turbine.

BRIEF DESCRIPTION OF THE INVENTION

In one aspect, a method of assembling a stator assembly is provided. The method includes coupling at least one stator ring segment to a portion of a casing using at least one groove defined in the casing. The method also includes coupling at least one stator blade assembly to a portion of the at least one stator ring segment such that at least one radial passage is at least partially defined by at least one of a portion of the at least one stator blade assembly and a portion of the at least one stator ring segment.

In another aspect, a stator assembly is provided. The assembly includes at least one first radial passage defined within at least a portion of at least one stator ring segment. The assembly also includes at least one second radial passage coupled in flow communication with the at least one first radial passage. The at least one second radial passage is at least partially adjacent to at least one of a portion of the at least one stator blade assembly and at least a portion of the at least one stator ring segment.

In a further aspect, a gas turbine engine is provided. The engine includes a turbine and a compressor rotatably coupled to the turbine. The compressor includes at least one stator assembly. The stator assembly includes at least one first radial passage defined within at least a portion of at least one stator ring segment. The stator assembly also includes at least one second radial passage coupled in flow communication with the at least one first radial passage. The at least one second radial passage is adjacent to at least one of a portion of the at least one stator blade assembly and at least a portion of the at least one stator ring segment.

DETAILED DESCRIPTION OF THE INVENTION

Figure 1:
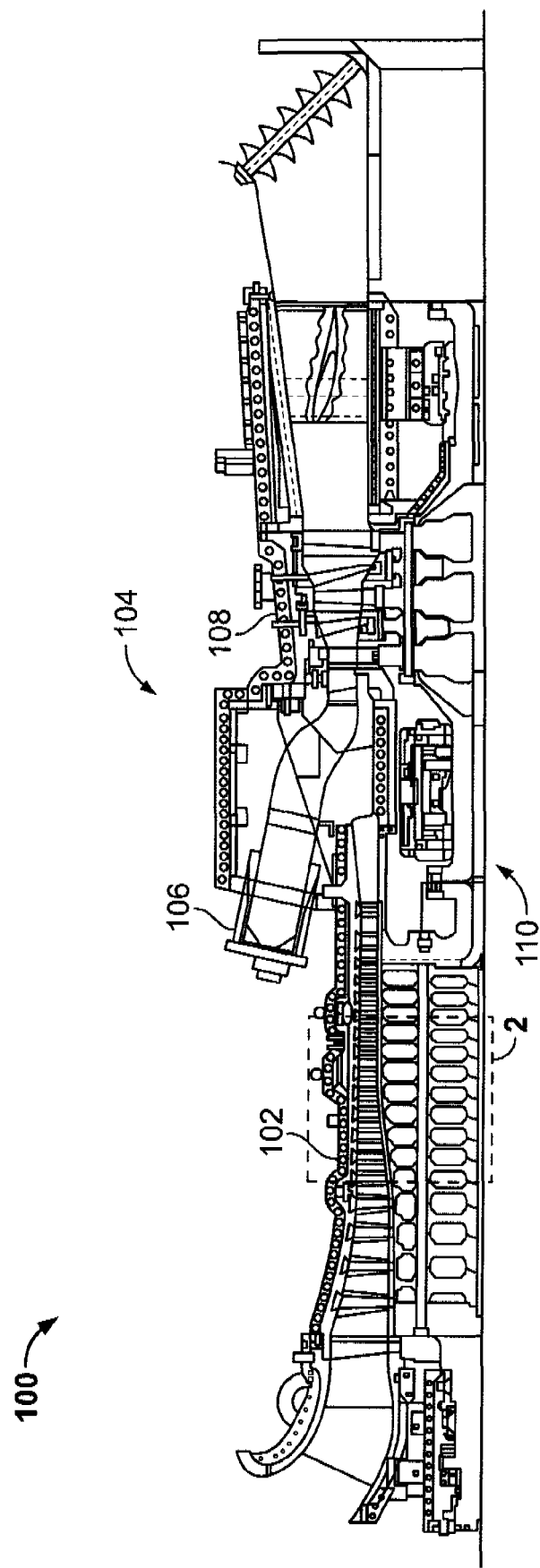
FIG. 1 is a schematic view of an exemplary gas turbine engine.

FIG. 1 is a schematic illustration of an exemplary gas turbine engine 100. Engine 100 includes a compressor 102 and a plurality of combustors 104. Combustor 104 includes a fuel nozzle assembly 106. Engine 100 also includes a turbine 108 and a common compressor/turbine rotor 110 (sometimes referred to as rotor 110). In one embodiment, engine 100 is a MS9001E engine, sometimes referred to as a 9E engine, commercially available from General Electric Company, Greenville, S.C.

Figure 2:
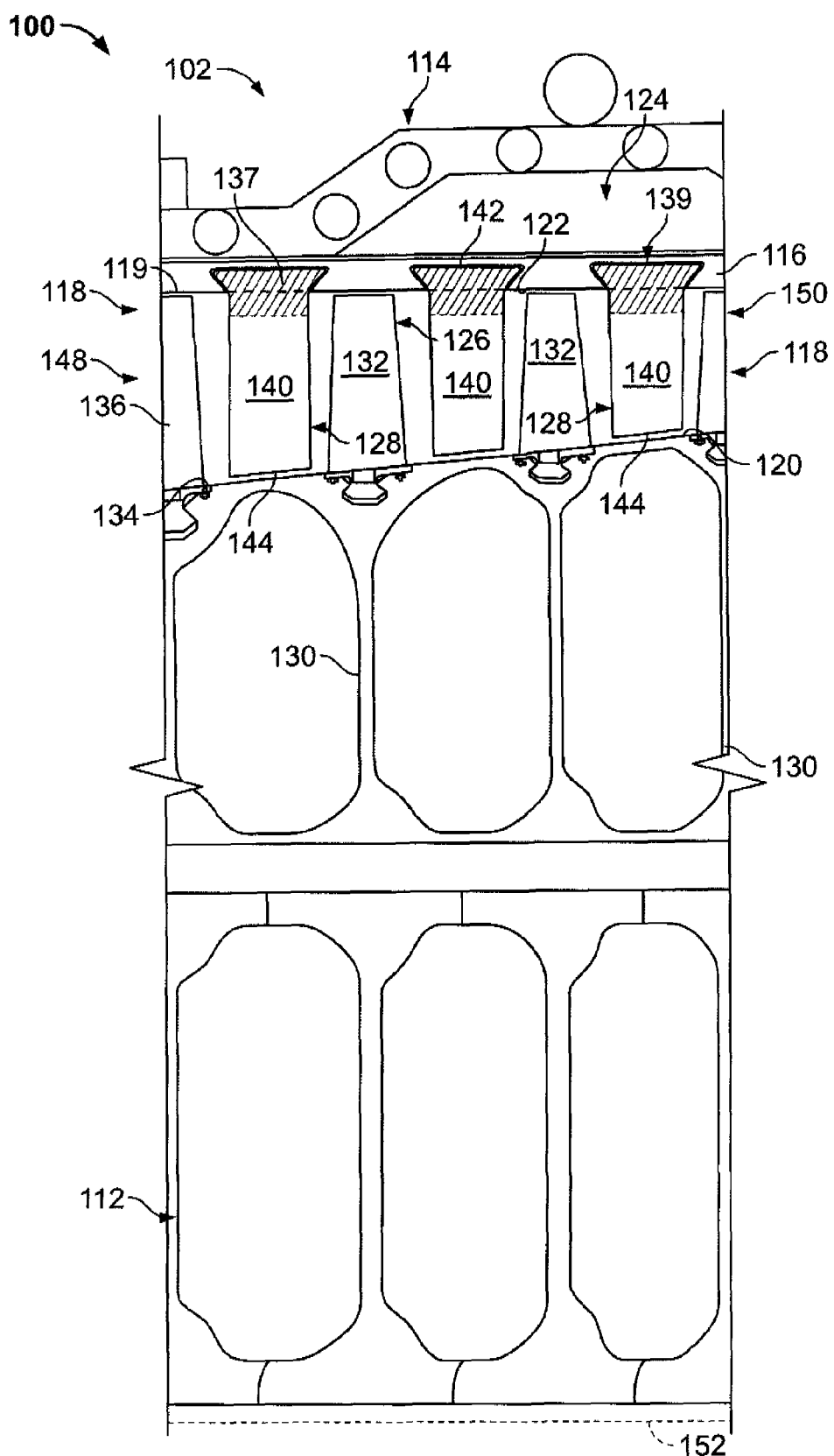
FIG. 2 is an enlarged cross-sectional view of a portion of a compressor that may be used with the gas turbine engine shown in FIG. 1 and taken along area 2.

FIG. 2 is an enlarged cross-sectional view of a portion of compressor 102 used with gas turbine engine 100 and taken along area 2 (shown in FIG. 1). Compressor 102 includes a rotor assembly 112 and a stator assembly 114 that are positioned within a casing 116 that at least partially defines a flow path 118 in conjunction with at least a potion of a casing radially inner surface 119. In the exemplary embodiment, rotor assembly 112 forms a portion of rotor 110 and is rotatably coupled to a turbine rotor (not shown). Rotor assembly 112 also partially defines an inner flow path boundary 120 of flow path 118, and stator assembly 114 partially defines an outer flow path boundary 122 of flow path 118, in cooperation with inner surface 119. Alternatively, stator assembly 114 and casing 116 are formed as a unitary and/or integrated component (not shown).

Compressor 102 includes a plurality of stages 124, wherein each stage 124 includes a row of circumferentially-spaced rotor blade assemblies 126 and a row of stator blade assemblies 128, sometimes referred to as stator vanes. Rotor blade assemblies 126 are coupled to a rotor disk 130 such that each blade assembly 126 extends radially outwardly from rotor disk 130. Moreover, each assembly 126 includes a rotor blade airfoil portion 132 that extends radially outward from an inner blade coupling apparatus 134 to a rotor blade tip portion 136. Compressor stages 124 cooperate with a motive or working fluid including, but not limited to, air, such that the motive fluid is compressed in succeeding stages 124.

Stator assembly 114 includes a plurality of rows of stator rings 137, sometimes referred to as stator-in-rings, stator support rings, and/or stator dovetail rings. Rings 137 are inserted into grooves 139 that are circumferentially defined in axial succession within at least a portion of casing 116. More specifically, each groove 139 is axially adjacent to a portion of casing 116 that is opposite rotor blade tip portions 136. Each stator ring 137 is sized, shaped and oriented to receive a plurality of stator blade assemblies 128 such that each row of blade assemblies 128 is positioned between a pair of axially adjacent rows of rotor blade assemblies 126. In the exemplary embodiment, each blade assembly 128 includes an airfoil portion 140 that extends from a stator blade dovetail portion (not shown in FIG. 2) to a stator blade tip portion 144. In the exemplary embodiment, compressor 102 includes one row of stator vanes 138 per stage 124, some of which are bleed stages (not shown in FIG. 2). Moreover, in the exemplary embodiment, compressor 102 is substantially symmetrical about an axial centerline 152.

In operation, compressor 102 is rotated by turbine 108 via rotor 110. Fluid collected from a low pressure region 148 via a first stage of compressor 102 is channeled by rotor blade airfoil portions 132 towards airfoil portions 140 of stator blade assemblies 128. The fluid is at least partially compressed and a pressure of the fluid is at least partially increased as the fluid is channeled through flow path 118. More specifically, the fluid continues to flow through subsequent stages that are substantially similar to the first stage 124 with the exception that flow path 118 generally narrows with successive stages to facilitate compressing and pressurizing the fluid as it is channeled through flow path 118. Compressed and pressurized fluid is subsequently channeled into a high pressure region 150 for use within turbine engine 100.

Figure 3:
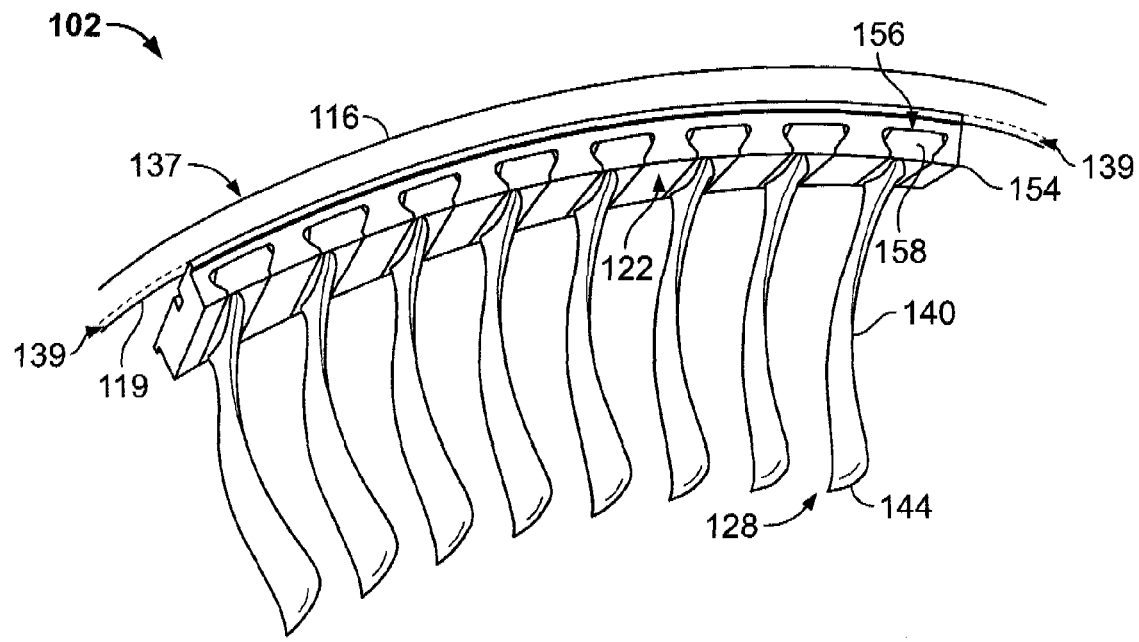
FIG. 3 is a perspective view of an exemplary stator blade ring segment that may be used with the compressor shown in FIG. 2.

FIG. 3 is a perspective view of an exemplary stator blade ring segment 154 that may be used with compressor 102. In the exemplary embodiment, segment 154 includes a plurality of stator blade grooves 156 that are each defined generally axially within segment 154. Moreover, each groove 156 is sized and shaped to receive a stator blade assembly 128. Each assembly 128 includes a stator blade dovetail portion 158 that enables stator blade assemblies 128 to be coupled to casing 116 via stator blade grooves 156. In the exemplary embodiment, each stator blade ring segment 154 is coupled to casing 116 via coupling methods that include, but are not limited to, a friction fit, the use of retention hardware (not shown), a welding process, or any other mechanical coupling means. Alternatively, segments 154 are formed integrally with casing 116. A plurality of ring segments 154 are inserted into each groove 139 such that segments 154 extend substantially circumferentially within compressor casing 116. As such, ring segments 154 define at least a portion of outer path flow boundary 122. Ring segments 154 include an axially upstream face 160 and an axially downstream face 162, as discussed further below.

An exemplary method of assembling stator assembly 114 (shown in FIG. 2) is provided. The method includes coupling stator ring segment 154 to a portion of casing 116 using at least one circumferential stator ring groove 139 defined in casing 116. The method also includes coupling stator blade assembly 128 to a portion of at least one stator ring segment 154 such that at least one radial passage, or slot (not shown in FIG. 3) is at least partially defined by at least one of a portion of stator blade assembly 128 and a portion of stator ring segment 154.

Figure 4:
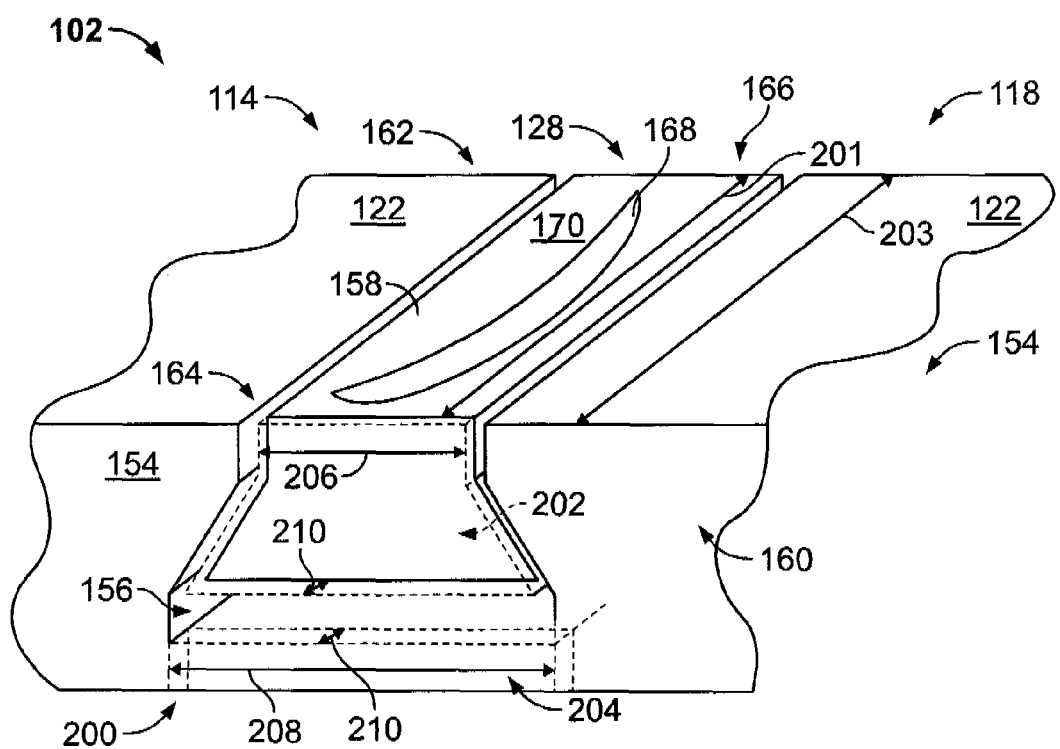
FIG. 4 is a perspective view of an exemplary bleed slot defined within a portion of the compressor shown in FIG. 2.

FIG. 4 is a perspective view of an exemplary bleed passage, or bleed slot 200 defined within a portion of compressor 102, and more specifically, a portion of stator assembly 114. For reference purposes only, FIG. 4 illustrates only a portion of stator assembly 114 wherein a portion of axially upstream face 160 and a portion of an axially downstream face 162 of ring segment 154 are illustrated. Moreover, FIG. 4 illustrates an axially upstream portion 164 and an axially downstream portion 166 of stator blade dovetail portion 158.

Groove 156 is sized and shaped to receive at least one stator blade dovetail portion 158 therein such that stator blade assembly 128 is secured in a pre-determined position. For reference, only a portion of a stator blade root portion 168 is illustrated in FIG. 4. More specifically, when each dovetail portion 158 is inserted within groove 156, a radially outer surface 170 of dovetail portion 158 is substantially flush with, or is substantially co-planar/co-arcuate with, outer flow path boundary 122.

Slot 200 is illustrated in FIG. 4 in phantom for perspective. In the exemplary embodiment, bleed slot 200 is oriented substantially radially within stator assembly 114. In the exemplary embodiment, slot 200 includes a first radial passage 204 defined within a radially outer portion of ring segment 154. Also, in the exemplary embodiment, slot 200 includes a second radial passage 202 that, in the exemplary embodiment, is defined substantially adjacent to upstream portion 164 and has an axial length 201 that is shorter than an axial length 203 of ring segment 154. Alternatively, slot 200 may be defined adjacent to downstream portion 166. In another alternative embodiment a plurality of slots 200 may be defined adjacent to both upstream portion 164 and downstream portion 166. In the exemplary embodiment, passage 204 is coupled in flow communication with flow path 118 via passage 202. In the exemplary embodiment, slot 200 is also at least partially defined by a component (not shown) positioned substantially adjacent to segment 154. For example, such a component may include, but is not limited to being, an extension of a rotating component (not shown) or an extension of a stationary component (not shown) such that a clearance (not shown) between the component and portion 160 is mitigated and channeling of the fluid into slot 200 is facilitated.

In the exemplary embodiment, slot 200 is partially defined by a first circumferential width 206, a second circumferential width 208, and an axial length 210. More specifically, in the exemplary embodiment, width 208 is wider than width 206. Alternatively, widths 206 and 208, as well as axial length 210, may have any dimensions that facilitate operation of slot 200 as described herein. In the exemplary embodiment, slot 200 is substantially dovetail-shaped. Alternatively, slot 200 has any shape that facilitates operation of slot 200 as described herein including, but not being limited to, a rectangular shape, a semi-circular shape and a semi-elliptical shape. Widths 206 and 208, length 210, and lengths 201 and 203 are variably selected based at least partially on material properties of segment 154 and dovetail 158, the axial location within compressor 102, bleed fluid flow requirements, and fluid flow characteristics in the vicinity of slot 200.

During operation, at least a portion of the fluid being compressed flowing through flow path 118 is channeled into and through slot 200 wherein the fluid is further channeled to fluid conduits (not shown) that may include, but not be limited to, tubing, piping, and fluid manifolds. Specifically, at least a portion of the compressed fluid being channeled through flow path 118 is channeled into passage 204 via passage 202.

The location and orientation of slot 200 within segment 154 and relative to dovetail portion 158 provides a plurality of benefits. For example, the location of slot 200 as described herein enables existing in-service compressors to be retrofit with a minimum of hardware modifications. As a result, slot 200 also facilitates reducing capital and labor costs associated with the modifications. Moreover, slot 200 may be optimally dimensioned and oriented to facilitate reducing fluid flow path distortion, reducing changes to existing segment 154 and dovetail portion 158 natural frequencies, reducing structural weakening of segment 154 and dovetail portion 158 and/or to facilitate reducing frequency tuning for segment 154 and dovetail portion 158.

Figure 5:
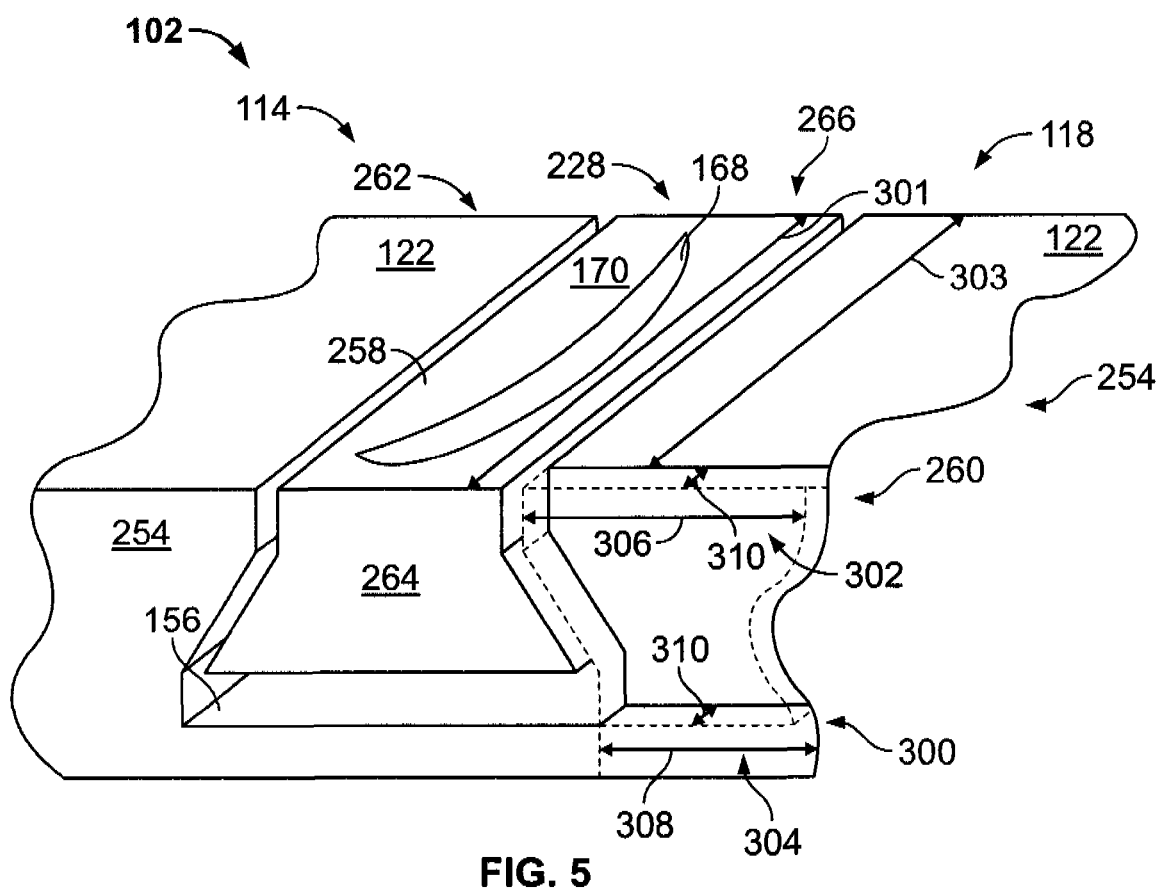
FIG. 5 is a perspective view of an alternative bleed slot that may be defined within a portion of the compressor shown in FIG. 2.

FIG. 5 is a perspective view of an alternative bleed slot 300 that may be defined within a portion of compressor 102, specifically, stator assembly 114. For reference purposes only, FIG. 5 only illustrates a portion of stator assembly 114, wherein a portion of an axially upstream face 260 and a portion of an axially downstream face 262 of an alternative ring segment 254 are illustrated. Moreover, FIG. 5 illustrates an axially upstream portion 264 and an axially downstream portion 266 of an alternative stator blade dovetail portion 258.

Groove 156 is sized and shaped to receive at least one stator blade dovetail portion 258 therein such that an alternative stator blade assembly 228 is secured in a pre-determined position. For reference, only a portion of a stator blade root portion 168 is illustrated in FIG. 5. More specifically, when each dovetail portion 258 is inserted within groove 156, a radially outer surface 170 of dovetail portion 258 is substantially flush with, or is substantially co-planar/co-arcuate with, outer flow path boundary 122.

Slot 300 is illustrated in FIG. 5 in phantom for perspective. In the alternative embodiment, bleed slot 300 is oriented substantially radially within stator assembly 114. Also, in this alternative embodiment, slot 300 is positioned to the circumferential right of dovetail portion 258. Alternatively, slot 300 is positioned to the circumferential left of portion 258 or on both circumferential sides of portion 258. In the exemplary embodiment, slot 300 includes a first radial passage 304 defined within a radially outer portion of ring segment 254. Also, in the exemplary embodiment, slot 300 includes a second radial passage 302 that, in the exemplary embodiment, is defined substantially adjacent to upstream portion 260 and has an axial length 301 that is greater than an axial length 303 of ring segment 254. Passage 304 is coupled in flow communication with flow path 118 via passage 302. Alternatively, slot 300 may be defined adjacent to downstream portion 262. In another alternative embodiment, a plurality of slots 300 may be defined adjacent to both upstream portion 260 and downstream portion 262. In the exemplary embodiment, slot 300 is also at least partially defined by a component (not shown) positioned substantially adjacent to dovetail portion 258. For example, such a component may include, but is not limited to being, an extension of a rotating component (not shown) or an extension of a stationary component (not shown) such that a clearance (not shown) between the component and portion 264 is mitigated and channeling of the fluid into slot 300 is facilitated.

In the exemplary embodiment, slot 300 is partially defined by a first circumferential width 306, a second circumferential width 308, and an axial length 310. More specifically, in the exemplary embodiment, width 308 is narrower than width 306. Alternatively, widths 306 and 308, as well as axial length 310, may have any dimensions that facilitate operation of slot 300 as described herein. In the exemplary embodiment, slot 300 is at least partially dovetail-shaped. Alternatively, slot 300 has any shape that facilitates operation of slot 300 as described herein including, but not being limited to, a rectangular shape, a semi-circular shape and a semi-elliptical shape. Widths 306 and 308, length 310, and lengths 301 and 303 are variably selected based at least partially on material properties of segment 254 and dovetail 258, the axial location within compressor 102, bleed fluid flow requirements, and fluid flow characteristics in the vicinity of slot 300.

During operation, at least a portion of the fluid being compressed flowing through flow path 118 is channeled into and through slot 300 wherein the fluid is further channeled to fluid conduits (not shown) that may include, but not be limited to, tubing, piping, and fluid manifolds. Specifically, at least a portion of the compressed fluid being channeled through flow path 118 is channeled into passage 304 via passage 302.

The location and orientation of slot 300 within a radially outer portion of segment 254 and relative to a radially inner portion of ring segment 254 provides a plurality of benefits. For example, the location of slot 300 as described herein enables existing in-service compressors to be retrofit with a minimum of hardware modifications. As a result, slot 300 also facilitates reducing capital and labor costs associated with the modifications. Moreover, slot 300 may be optimally dimensioned and oriented to facilitate reducing fluid flow path distortion, reducing changes to existing segment 254 and dovetail portion 258 natural frequencies, reducing structural weakening of segment 254 and dovetail portion 258 and/or to facilitate reducing frequency tuning for segment 254 and dovetail portion 258.

Figure 6:
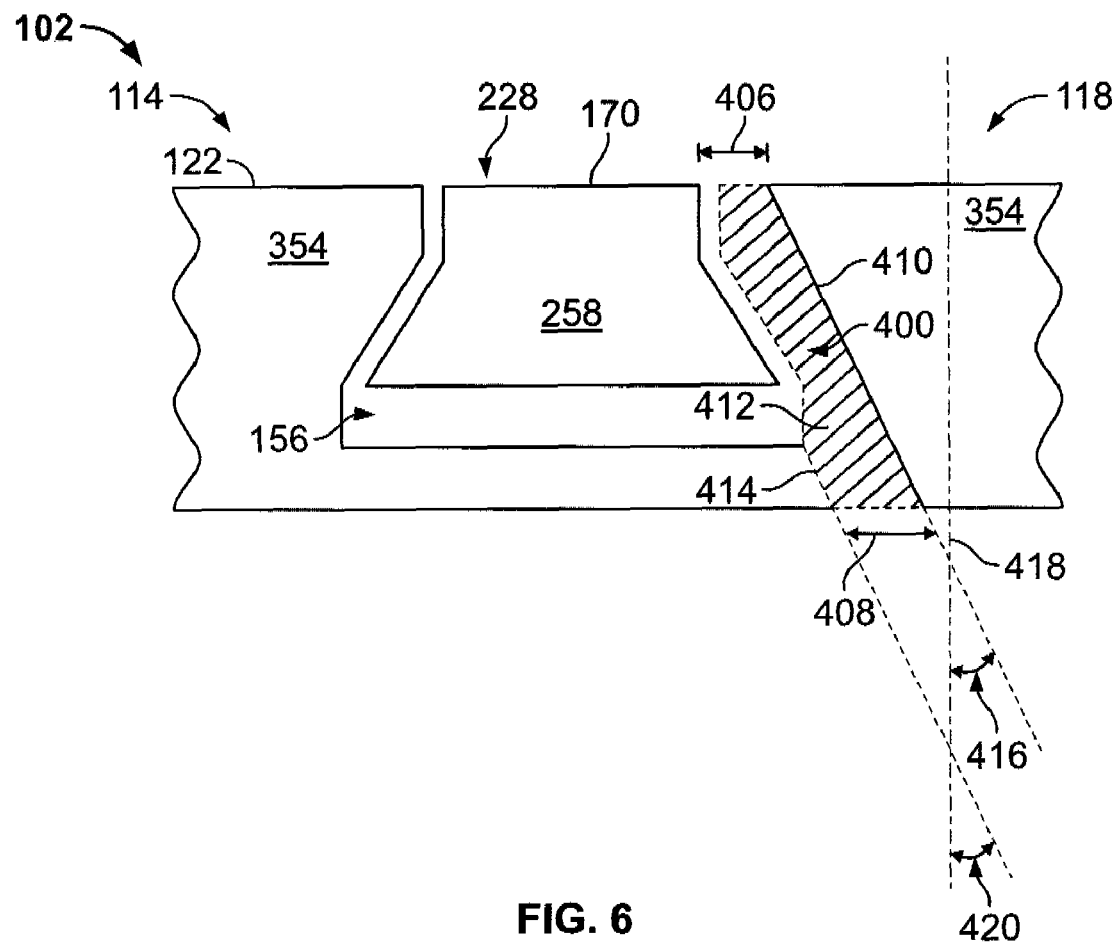
FIG. 6 is a cross-sectional view of another alternative bleed slot that may defined within a portion of the compressor shown in FIG. 2.

FIG. 6 is a cross-sectional view of another alternative bleed slot 400 that may be defined within a portion of compressor 102, specifically, stator assembly 114. In this alternative embodiment, alternative slot 400 is at least partially defined by a circumferentially adjacent portion of dovetail portion 258, a first circumferential wall 410, an axial wall 412 (shown in cross-hatch in FIG. 6), and a second circumferential wall 414. Walls 410, 412 and 414 are formed within at least a portion of alternative ring segment 354. In this alternative embodiment, bleed slot 400 includes a first circumferential width 406 and a second circumferential width 408 as well as an axial length (not shown) wherein widths 406 and 408 are substantially similar. Alternatively, widths 406 and 408 and the length of slot 400 are any values that facilitate operation of bleed slot 400 as described herein.

In this alternative embodiment, wall 410 is formed with a first wall angle 416 that is acute measured with respect to a radial axis 418 of compressor 102. Moreover, in this alternative embodiment, wall 414 is formed within segment 354 at a second wall angle 420 that is acute measured with respect to radial axis 416. Also, in the exemplary embodiment, angles 416 and 420 are substantially similar. Alternatively, angles 416 and 420 may be any angles that facilitate operation of slot 400 as described herein, including obtuse angles and zero angles, measured with respect to radial axis 418. Widths 404 and 406, the length, and angles 416 and 420, are variably selected based at least partially on material properties of segment 354, the axial location within compressor 102, bleed fluid flow requirements, and fluid flow characteristics in the vicinity of slot 400.

Also, in this alternative embodiment, slot 400 is positioned and oriented to the circumferential right of dovetail portion 258. Alternatively, slot 400 is positioned and oriented to the circumferential left of portion 258, or positioned and oriented on both circumferential sides of portion 258. Moreover, in this alternative embodiment, slot 400 is positioned and oriented on an upstream portion (not shown) of segment 354. Alternatively, slot 400 is positioned and oriented on a downstream portion (not shown) of segment 354. Further, alternatively, a plurality of slots 400 are defined substantially adjacent to both the upstream portion and the downstream portion of segment 354.

During operation, at least a portion of the fluid being compressed flowing through flow path 118 is channeled into and through slot 400 wherein the fluid is further channeled to fluid conduits (not shown) that may include, but not be limited to, tubing, piping, and fluid manifolds.

Figure 7:
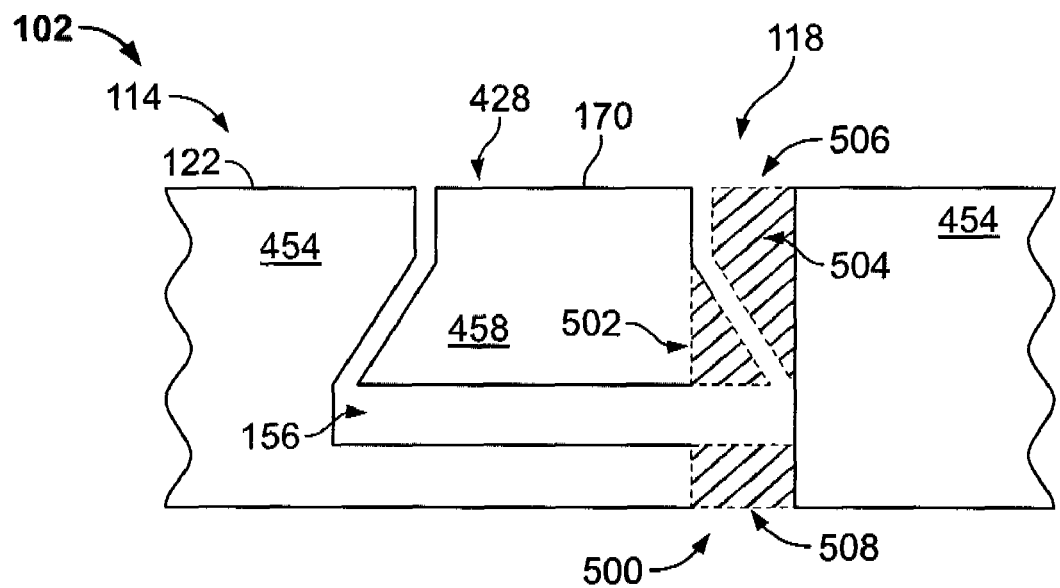
FIG. 7 is a cross-sectional view of another alternative bleed slot that may be defined within a portion of the compressor shown in FIG. 2.

FIG. 7 is a cross-sectional view of another alternative bleed slot 500 that may be defined within a portion of compressor 102, specifically, stator assembly 114. In the alternative embodiment, elements of bleed slot 200 (shown in FIG. 4) and bleed slot 300 (shown in FIG. 5) are combined to define bleed slot 500. Specifically, an alternative stator blade assembly 428 includes a stator blade dovetail portion 458 and a dove tail slot portion 502. Moreover, an alternative stator blade ring segment 454 includes a ring segment slot portion 504, wherein portion 502 and portion 504 are substantially adjacent to each other and are coupled in flow communication such that an upper passage 506 is defined. Furthermore, segment 454 includes a lower passage 508 that is coupled in flow communication with upper passage 506.

In this alternative embodiment, slot 500 includes any dimensions and any orientation that facilitates operation of slot 500 as described herein. Also, in this alternative embodiment, slot 500 is positioned and oriented to the circumferential right of dovetail portion 458. Alternatively, slot 500 is positioned and oriented to the circumferential left of portion 458, or positioned and oriented on both circumferential sides of portion 458.

Also, in this alternative embodiment, slot 500 is positioned and oriented to the circumferential right of dovetail portion 458. Alternatively, slot 500 is positioned and oriented to the circumferential left of portion 458, or positioned and oriented on both circumferential sides of portion 458. Moreover, in this alternative embodiment, slot 500 is positioned and oriented on an upstream portion (not shown) of segment 454 and dovetail portion 458. Alternatively, slot 500 is positioned and oriented on a downstream portion (not shown) of segment 454 and dovetail portion 458. Further, alternatively, a plurality of slots 500 are defined substantially adjacent to both upstream portions and downstream portion of segment 454 and dovetail portion 458.

During operation, at least a portion of the fluid being compressed flowing through flow path 118 is channeled into and through slot 500 wherein the fluid is further channeled to fluid conduits (not shown) that may include, but not be limited to, tubing, piping, and fluid manifolds.

Figure 8:
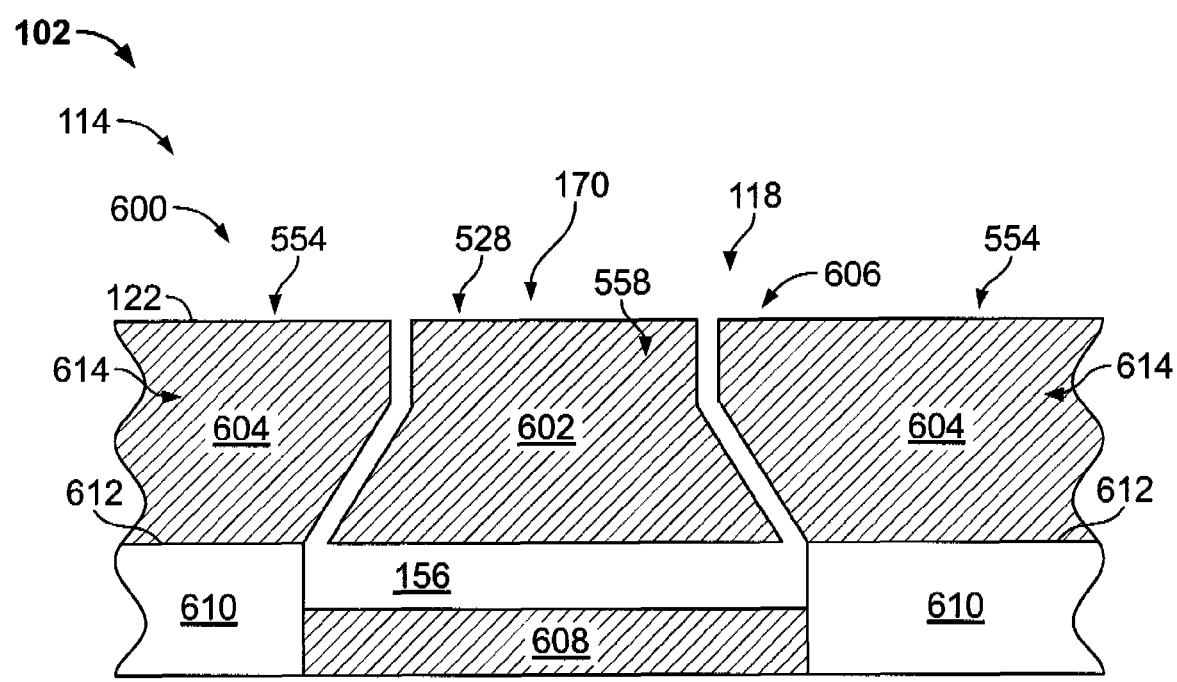
FIG. 8 is a cross-sectional view of another alternative bleed slot that may be defined within a portion of the compressor shown in FIG. 2.

FIG. 8 is a cross-sectional view of another alternative bleed slot 600 that may be defined within a portion of compressor 102, specifically, stator assembly 114. In the alternative embodiment, elements of bleed slot 200 (shown in FIG. 4) and bleed slot 300 (shown in FIG. 5) are combined to define bleed slot 600. Specifically, an alternative stator blade assembly 528 includes a stator blade dovetail portion 558 and a dovetail slot portion 502. Moreover, an alternative stator blade ring segment 554 includes a ring segment slot portion 504, wherein portion 502 and portion 504 are substantially adjacent to each other and are coupled in flow communication such that an upper passage 506 is defined. Furthermore, segment 554 includes a lower passage 608 that is coupled in flow communication with upper passage 606. Also, segment 554 includes an axially upstream tab portion 610, wherein tab portion 610 includes an annular surface 612 extending axially forward from an axially upstream face 614 of segment 554.

In this alternative embodiment, upper passage 606 extends substantially circumferentially in a 360° arc (only a portion shown). Also, in this alternative embodiment, a plurality of lower passages 608 (only one shown) are oriented such that they are circumferentially separated by a plurality of tab portions 610 (only two shown). Further, in this alternative embodiment, passages 608 are substantially similar to first radial passage 204 (shown in FIG. 4). Alternatively, passages 608 are substantially similar to lower passage 508 (shown in FIG. 7). Moreover, in this alternative embodiment, slot 600 is positioned and oriented on an axially upstream portion of segment 554 and dovetail portion 558. Alternatively, slot 600 is positioned and oriented on a downstream portion (not shown) of segment 554 and dovetail portion 558. Also, alternatively, upper passage 606 and lower passage 608 include any dimensions and any orientations that facilitate operation of slot 600 as described herein.

During operation, at least a portion of the fluid being compressed flowing through flow path 118 is channeled into and through slot 600 wherein the fluid is further channeled to fluid conduits (not shown) that may include, but not be limited to, tubing, piping, and fluid manifolds.

The method and apparatus for assembling a compressor as described herein facilitates operation of a turbine engine. Specifically, at least one bleed slot defined within a stator ring as described above facilitates an effective compressor bleed configuration. More specifically, such configuration facilitates optimally dimensioned and oriented slots to facilitate reducing fluid flow path distortion, reducing changes to existing stator rings' natural frequencies, reducing structural weakening of stator rings and facilitate a reduction of frequency tuning for stator rings. Moreover, a method of defining such slots as described herein facilitates retrofitting existing in-service compressors by reducing hardware modifications as well as reducing capital and labor costs associated with affecting such modifications.

Exemplary embodiments of compressor bleed slots as associated with turbine engines are described above in detail. The methods, apparatus and systems are not limited to the specific embodiments described herein nor to the specific illustrated compressor bleed slots.

While the invention has been described in terms of various specific embodiments, those skilled in the art will recognize that the invention can be practiced with modification within the spirit and scope of the claims.

What is claimed is:

1. A method of assembling a stator assembly, said method comprising:
   coupling at least one stator ring segment to a portion of a casing using at least one groove defined in the casing; and
   coupling at least one stator blade assembly to a portion of the at least one stator ring segment such that at least a first radial passage and at least a second radial passage are defined, wherein the at least one first radial passage is defined within a portion of the at least one stator ring segment, and the at least one second radial passage is coupled in flow communication with the at least one first radial passage, such that the at least one second radial passage extends from a radially inner portion of the at least one stator blade assembly to a radially outermost portion of the at least one stator blade assembly.

2. A method in accordance with claim 1 wherein coupling at least one stator blade assembly comprises coupling the at least one stator blade assembly to the at least one stator ring segment such that the second radial passage is at least partially adjacent to at least one of:
   a portion of the at least one stator blade assembly; and
   a portion of the at least one stator ring segment.

3. A method in accordance with claim 1 further comprising:
   forming at least one axial stator blade groove in at least a portion of the at least one stator ring segment; and
   inserting the at least one stator blade assembly into a portion of the at least one axial stator blade groove such that a dovetail portion of the blade assembly is received within the at least one axial stator blade groove.

4. A method in accordance with claim 1 further comprising:
   coupling at least one rotor blade to a rotor; and
   positioning the at least one rotor blade such that the at least one rotor blade and the at least one stator blade assembly cooperate to facilitate increasing a pressure of fluid channeled through an engine.

5. A stator assembly comprising:
   at least one first radial passage defined within a portion of at least one stator ring segment; and at least one second radial passage coupled in flow communication with said at least one first radial passage, wherein said at least one second radial passage is at least partially adjacent to at least one of:

a portion of at least one stator blade assembly; and a portion of said at least one stator ring segment, said at least one second radial passage is at least partially defined by a portion of at least one axial wall formed within at least one of:

an upstream portion of said at least one stator blade assembly; and a downstream portion of said at least one stator blade assembly, such that said at least one second radial passage extends from a radially inner portion of said at least one stator blade assembly to a radially outermost portion of said at least one stator blade assembly.

6. A stator assembly in accordance with claim 5 wherein said at least one first radial passage is defined at a pre-determined axial and circumferential position within said at least one stator ring segment.

7. A stator assembly in accordance with claim 5 wherein said at least one second radial passage is at least partially defined by a portion of at least one wall formed within at least one of:

an upstream portion of said at least one stator ring segment; and a downstream portion of said at least one stator ring segment.

8. A stator assembly in accordance with claim 7 wherein said at least one second radial passage extends from a radially innermost portion of said at least one stator ring segment to a radially outermost portion of said at least one stator ring segment.

9. A stator assembly in accordance with claim 5 wherein said at least one second radial passage comprises one of:

a substantially semi-circular opening;

a substantially semi-elliptical opening; and a substantially rectangular opening.

10. A stator assembly in accordance with claim 5 wherein said at least one stator blade assembly and said at least one stator blade groove comprise a dovetail configuration.

11. A stator assembly in accordance with claim 5 wherein said stator assembly facilitates fluid transport within a compressor.

12. A gas turbine engine comprising:

a turbine; and a compressor rotatably coupled to said turbine, said compressor comprising at least one stator assembly comprising at least one first radial passage defined within a portion of at least one stator ring segment, and at least one second radial passage coupled in flow communication with said at least one first radial passage, wherein said at least one second radial passage is adjacent to at least one of:

a portion of at least one stator blade assembly; and a portion of said at least one stator ring segment, said at least one second radial passage extends from a radially inner portion of said at least one stator blade assembly to a radially outermost portion of said at least one stator blade assembly.

13. A gas turbine engine in accordance with claim 12 wherein said at least one first radial passage is defined at a pre-determined axial and circumferential position within said at least one stator ring segment.

14. A gas turbine engine in accordance with claim 12 wherein said at least one second radial passage is at least partially defined by a portion of at least one axial wall formed within at least one of:

an upstream portion of said at least one stator ring segment; and a downstream portion of said at least one stator ring segment.

15. A gas turbine engine in accordance with claim 14 wherein said at least one second radial passage extends from a radially innermost portion of said at least one stator ring segment to a radially outermost portion of said at least one stator ring segment.

16. A gas turbine engine in accordance with claim 12 wherein said at least one second radial passage comprises one of:

a substantially semi-circular opening;

a substantially semi-elliptical opening; and a substantially rectangular opening.

* * * * *